June 21, 1949.　　　F. I. RATAICZAK　　　2,473,904
REFRIGERATING APPARATUS

Filed April 23, 1946　　　　　　　　　　2 Sheets-Sheet 1

INVENTOR.
Francis I. Rataiczak
BY *Jeunier, Hardman & Fehr*
*His Attorneys.*

June 21, 1949.  F. I. RATAICZAK  2,473,904
REFRIGERATING APPARATUS
Filed April 23, 1946  2 Sheets-Sheet 2

INVENTOR.
Francis I. Rataiczak.
BY Spencer, Hardman & Fehr.
His Attorneys.

Patented June 21, 1949

2,473,904

UNITED STATES PATENT OFFICE 2,473,904

REFRIGERATING APPARATUS

Francis I. Rataiczak, Dayton, Ohio, assignor to General Motors Corporation, Dayton, Ohio, a corporation of Delaware Application April 23, 1946, Serial No. 664,417

6 Claims. (Cl. 230—58)

This invention relates to refrigerating apparatus and more particularly to an improved motor-compressor construction.

It is an object of this invention to simplify the construction and method of assembly of a sealed motor-compressor unit.

A further object of this invention is to reduce the cost of construction of a motor-compressor unit.

Still another object of this invention is to provide a motor stator mounting bracket which facilitates removal of the motor stator for repair and inspection purposes.

Still another object of this invention is to provide a motor stator mounting bracket which compensates for irregularities in the bracket engaging surfaces of the motor-compressor housing.

Further objects and advantages of the present invention will be apparent from the following description, reference being had to the accompanying drawings, wherein a preferred form of the present invention is clearly shown.

Figure 1:
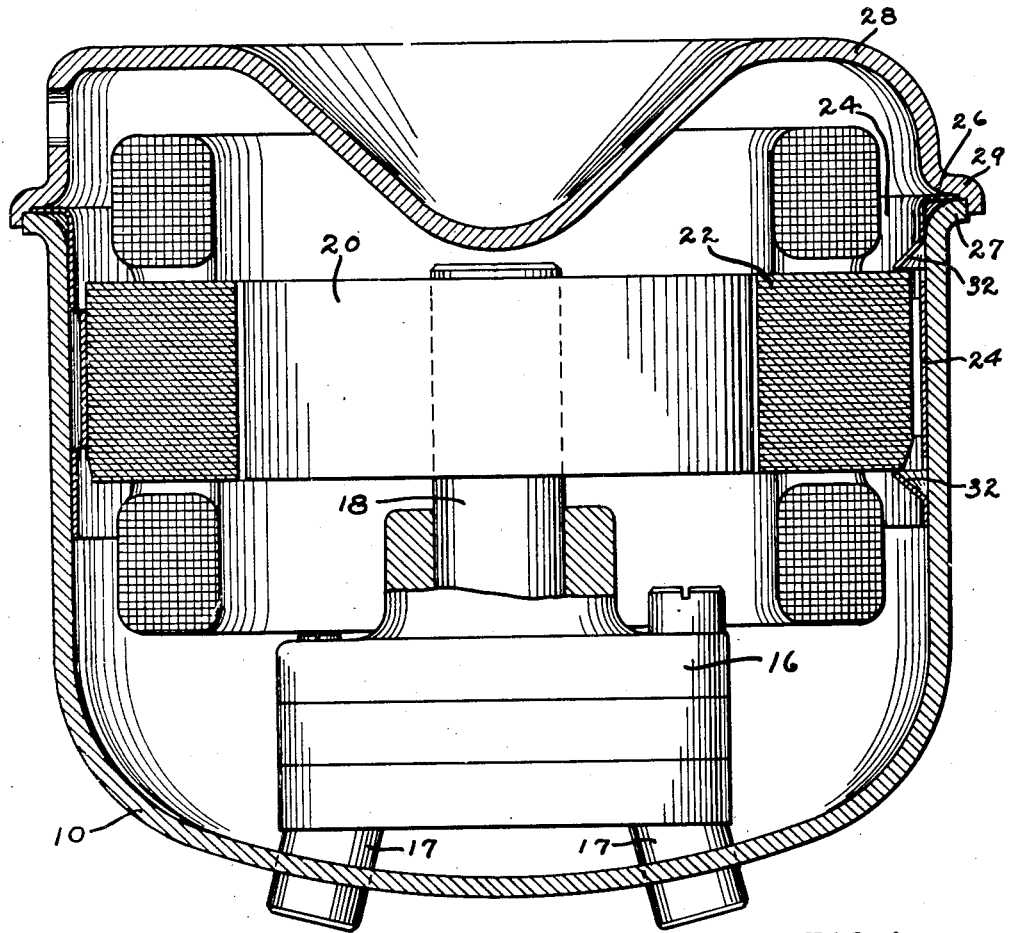
Fig. 1 is a vertical sectional view showing my invention applied to a sealed motor-compressor assembly.

Referring now to the drawings wherein a preferred form of the invention has been shown, reference numeral 10 designates a stamped sheet metal outer housing or shell within which there is mounted a conventional rotary compressor 16. The compressor 16 is supported on suitable mounting blocks 17 which allow for adjustment of the compressor sideways as explained in my Patent No. 2,405,904, dated August 13, 1946, to which reference is hereby made for a more complete description of the compressor per se and the method of assembly. The compressor is provided with a drive shaft 18 on which there is mounted a conventional motor rotor 20 in accordance with usual practice. A motor stator 22 is arranged as shown and is held in place within the upper end of the casing 10 by means of a mounting bracket 24.

Figure 2:
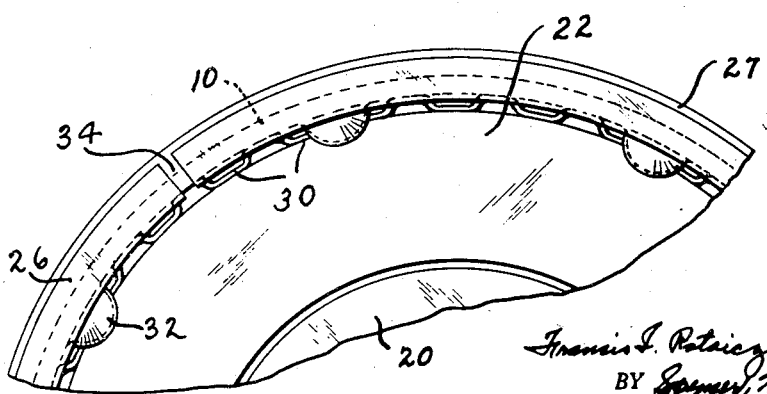
Fig. 2 is a fragmentary plan view showing the relationship of the motor stator mounting bracket to the outer housing and the motor stator.
Figure 3:
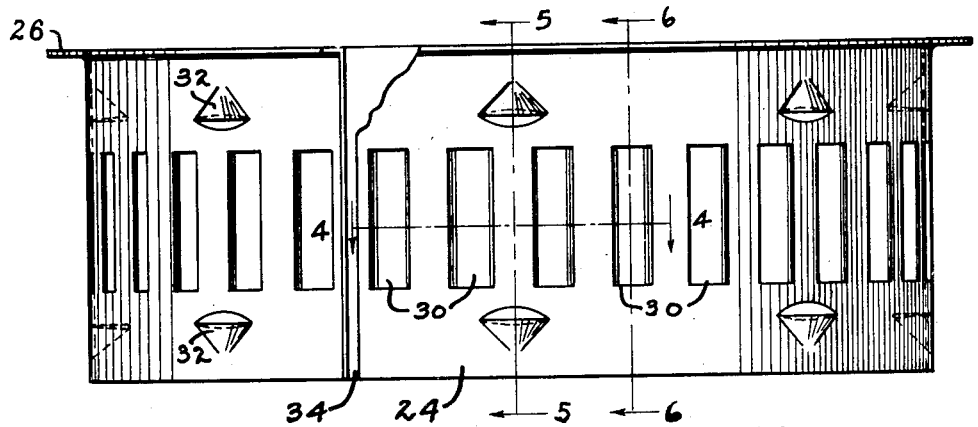
Fig. 3 is a side elevational view of the motor stator mounting bracket per se showing one corner broken away.
Figure 4:
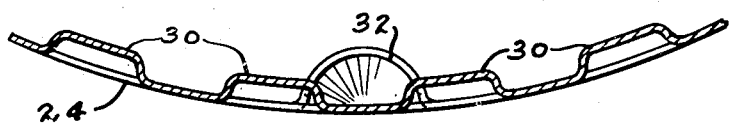
Fig. 4 is a fragmentary sectional view taken on the line 4—4 of Fig. 3.
Figures 5, 6:
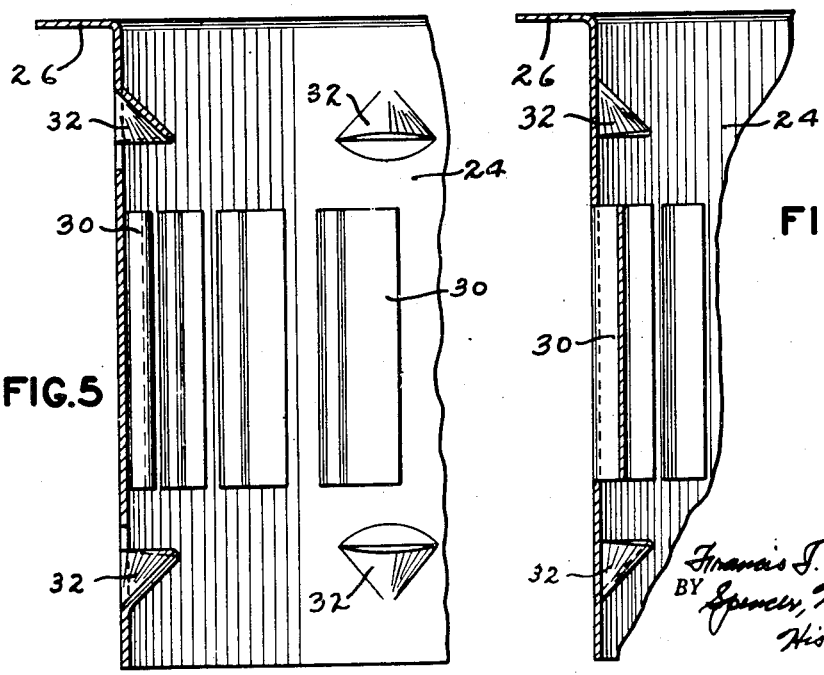
Fig. 5 is a fragmentary sectional view taken substantially on line 5—5 of Fig. 3.
Fig. 6 is a fragmentary sectional view taken on line 6—6 of Fig. 3.

As shown in Figs. 2 through 6, the mounting bracket 24 is in the form of a substantially cylindrical split collar-like element and is provided with a radially extending flange 26 which is adapted to be held in place between the radially extending flange 27 of the main casing 10 and a complementary flange 29 of the cap 28. The cap 28 may be welded or otherwise secured to the casing 10. The upper surface of the flange 27 constitutes a ledge which in cooperation with the flange 26 of the mounting bracket 24 limits the downward movement of the motor stator during assembly. The flange 26 also serves as a reinforcing element which adds rigidity to the bracket and thereby helps to hold the bracket in the cylindrical shape before assembly. The bracket 24 is provided with a plurality of embossed motor stator engaging ribs or corrugations 30 and motor stator locating ears 32. The ribs 30 serve to compensate for minor irregularities in the construction of the motor stator and the casing 10. The locating ears 32 limit vertical movement of the motor stator relative to the bracket 24.

The bracket 24 may be made very cheaply since it is formed from flat sheet stock by means of conventional punch press operations. The ends of the bracket or split collar element 24 don't quite meet whereby a gap 34 is formed making it possible to spread the bracket enough to insert the motor stator before the motor stator and mounting bracket are slipped down into the casing 10. The ears 32 are shaped so as to serve as cams for facilitating spreading the bracket during insertion of the motor stator into the bracket. As explained hereinabove the bracket 24 is held in place within the casing 10 by the cap member 28. In the event that it becomes necessary for any reason to open up the motor-compressor casing for repair or inspection purposes this may be done by removing the cap 28 and lifting out the motor stator and motor stator mounting bracket.

It will be noted that the mounting bracket 24 extends both above and below the laminated core of the motor stator 22 with the result that the bracket 24 is in contact with the outer shell throughout a considerable area whereby the transfer of motor heat to the outer shell is facilitated.

It will also be noted that the construction and arrangement of the parts eliminate the need for accurate machining of the motor stator mounting surfaces. The embossed ribs 30 yield sufficiently during assembly, to compensate for irregularities in the surfaces of the outer shell 10 or the motor stator 22. In the prior type of mounting brackets which were brazed to the outer shell, the brazing operation served to anneal the brackets whereas in the present construction the work hardening of the material taking place during the formation of the bracket is not disturbed by any further heat treatment. Another important advantage of the new type of bracket is that in the event that it is necessary to replace a motor stator for any reason, the mounting bracket may be replaced, if necessary, without much cost or trouble.

While the form of embodiment of the invention as herein disclosed, constitutes a preferred form, it is to be understood that other forms might be adopted, as may come within the scope of the claims which follow.

What is claimed is as follows:

1. In combination, a housing, a motor including a motor stator, a motor stator mounting bracket carried by said housing and comprising a split ring arranged in engagement with said housing and having axially extending embossed ribs adapted to engage said motor stator, and motor stator positioning ears embossed in said ring limiting axial movement of said stator, said ears comprising inwardly protruding conical portions in which the base of each conical portion faces the motor stator and in which the outer surface of the conical portion constitutes a cam surface for camming the split ring outwardly as the motor stator is inserted into the ring during assembly.

2. In combination, a housing element, a cover for said housing element, a motor including a motor stator element disposed within said housing, a motor stator element mounting bracket carried by said housing element and comprising a cylindrical strip of metal disposed between said stator element and said housing element, said strip of metal having embossed portions for increasing the effective thickness of said strip and having a plurality of radially projecting flange portions clamped between said housing element and said cover.

3. A motor-compressor unit comprising in combination, a cup-shaped shell having a substantially smooth unobstructed inner wall surface and being provided with a ledge at its open end, a cover closing the open end of said shell, a motor and a compressor, means for supporting said compressor within said shell, said motor including a stator, bracket means for mounting said stator within said shell, said bracket means being disposed between said stator and said inner wall surface of said shell, said bracket means having spaced apart inwardly projecting ears engaging portions of said stator and preventing movement thereof relative to said bracket means, and said bracket means also having an integral outwardly directed flange engaging said ledge and being clamped thereto by said cover for supporting said stator from said shell along said smooth inner wall surface thereof.

4. The combination defined in claim 3 wherein portions of the bracket located between the motor stator and the inner wall surface of the shell are corrugated.

5. In combination, means enclosing a motor and a compressor, said means including a cup-shaped shell and a cover closing the open end of said shell, said shell having a substantially smooth unobstructed inner wall surface, said motor including a stator, a mounting bracket for said motor stator, said bracket comprising a split collar-like element disposed between said stator and said inner wall surface of said shell, said element having spaced apart inwardly directed ears engaging portions of said stator and preventing movement thereof relative to said element, and said element also having an outwardly projecting flange clamped between said shell and said cover, said flange and said ears on said element together forming the means of supporting said motor stator from said shell along said smooth inner wall surface thereof.

6. The combination defined in claim 5 wherein portions of the collar element located between the motor stator and the inner wall surface of the shell are corrugated.

FRANCIS I. RATAICZAK.

REFERENCES CITED

The following references are of record in the file of this patent:

UNITED STATES PATENTS

| Number | Name | Date |
| --- | --- | --- |
| 2,113,691 | Heller | Apr. 12, 1938 |
| 2,178,811 | Sateren | Nov. 7, 1939 |
| 2,179,268 | Neeson | Nov. 7, 1939 |
| 2,243,466 | Kucher | May 27, 1941 |
| 2,246,868 | Trask | June 24, 1941 |
| 2,285,754 | Money | June 9, 1942 |
| 2,364,038 | Touborg | Nov. 28, 1944 |
| 2,423,719 | Muffly | July 8, 1947 |